April 26, 1960  J. W. CRAMER ET AL  2,933,823
DRYER TEMPERATURE CONTROL
Filed March 31, 1958

INVENTORS
J.W. CRAMER
C.L. OSBURN, JR.
BY
Hudson & Young
ATTORNEYS

United States Patent Office 2,933,823
Patented Apr. 26, 1960

2,933,823
DRYER TEMPERATURE CONTROL

John W. Cramer, Crystal City, Mo., and Carl L. Osburn, Jr., Bartlesville, Okla., assignors to Phillips Petroleum Company, a corporation of Delaware Application March 31, 1958, Serial No. 725,053

5 Claims. (Cl. 34—48)

This invention relates to apparatus for controlling the temperatures of drying equipment.

In various chemical operations there is a need for equipment which is capable of drying materials being processed. It is a common practice to introduce heated gases into such equipment to elevate the temperature of the material to be dried. One particular example of such a process occurs in the production of polyethylene. The polymer, which may be produced in the presence of a solvent, is directed to the inlet of a dryer. Heated hydrocarbon vapors are circulated through the dryer to accomplish the drying of the polymer. In such an operation, it is important that the temperature of the vapors not exceed a predetermined value because excessive temperatures can result in the polymer being dissolved.

In accordance with the present invention, novel drying temperature control apparatus is provided which normally tends to maintain the interior of the dryer at a predetermined temperature. A safety control feature is provided which reduces the temperature of the heated vapors, if necessary, in order to prevent these vapors from entering the dryer at an excessive temperature. The temperature control means of this invention utilize temperature sensing elements disposed within the dryer and in the conduit delivering the drying material to the dryer. These temperature sensing elements cooperate to control the temperature of the drying vapors.

Accordingly, it is an object of this invention to provide improved apparatus for controlling the temperature of drying equipment.

Another object is to provide apparatus for preventing the temperature of vapors supplied to a dryer from exceeding a predetermined value.

Other objects, advantages and features of this invention should become apparent from the following detailed description which is taken in conjunction with the accompanying drawing in which.

Figure 1:
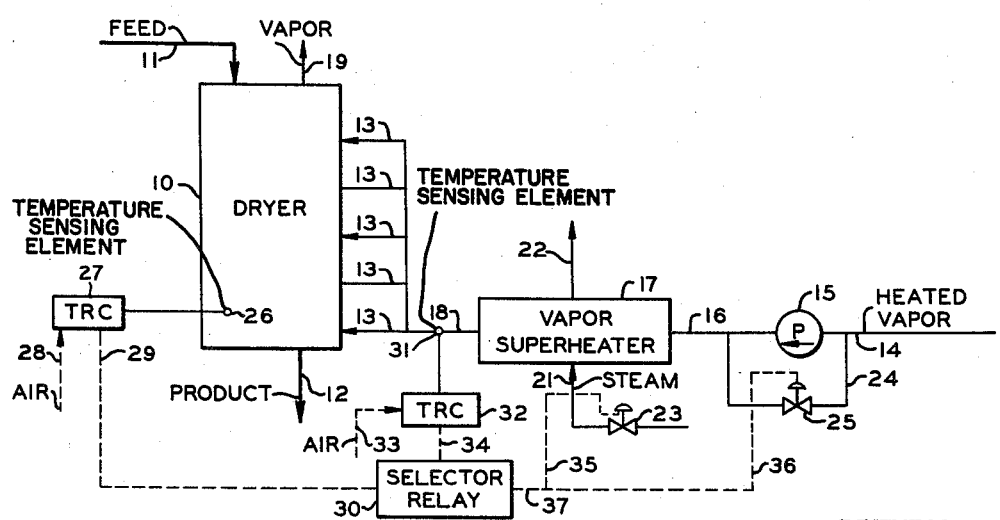
Figure 1 is a schematic representation of the dryer control apparatus of this invention.

Referring now to the drawing in detail and to Figure 1 in particular, there is shown a conventional dryer 10 which is supplied with a feed inlet 11 and a product removal outlet 12. A suitable commercial dryer which can be employed is described in Bulletin No. 1506 of Wyssmont Company, Long Island City, New York.

Heater vapor is introduced into the system through a conduit 14 which communicates with the inlet of a blower 15. The outlet of blower 15 is connected by a conduit 16 to the inlet of a vapor superheater 17. The outlet of superheater 17 is connected by a conduit 18 to conduits 13. Vapor is removed from dryer 10 through an outlet 19. Steam, or other heating material, is supplied to superheater 17 through a conduit 21 and is exhausted through a conduit 22.

A control valve 23 is positioned in conduit 21. A bypass conduit 24, having a control valve 25 therein, communicates between conduits 16 and 14 so that a portion of the vapor delivered by blower 15 can be recirculated back to the inlet of the blower. The temperature within dryer 10 is measured by a sensing element 26 which is connected to a conventional pneumatically operated temperature recorder-controller 27, such as described in Bulletin 450, The Foxboro Company, Foxboro, Massachusetts, or Catalog No. 8904, The Brown Instrument Company, Philadelphia, Pennsylvania, for example. Air at a predetermined pressure is introduced into controller 27 through a line 28. Controller 27 establishes a pneumatic pressure in outlet line 29 which is representative of the temperature in dryer 10. Line 29 is applied to the first inlet of a selector relay 30. The temperature in conduit 18 is measured by a sensing element 31 which actuates a second temperature recorder-controller 32. Air at a predetermined pressure is introduced into controller 32 through a line 33. Controller 32 establishes a pneumatic pressure in a line 34 which is representative of the temperature of the vapor in conduit 18. Line 34 is connected to the second inlet of selector relay 30. The outlet line 37 of selector relay 30 is connected by a line 35 to control valve 23 and by a line 36 to control valve 25.

Figure 2:
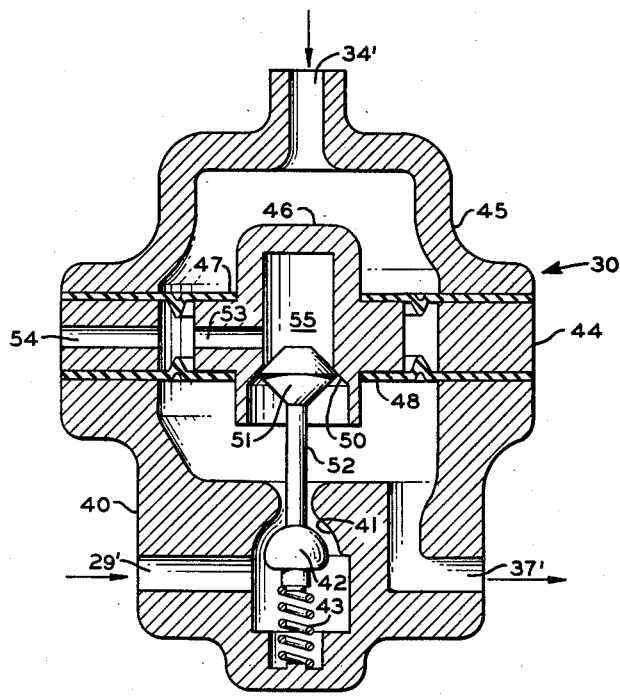
Figure 2 is a detailed view, shown partially in section, of the selector relay employed in the apparatus of Figure 1.

A suitable selector relay for use in the control system of Figure 1 is illustrated schematically in Figure 2. This relay comprises a housing 40 which is provided with an inlet 29' and an outlet 37'. Inlet 29' and outlet 37' are connected to respective lines 29 and 37 of Figure 1. A valve seat 41 is formed in housing 40 between inlet 29' and outlet 37'. A valve head 42 is disposed within housing 40 so as to be urged upwardly into engagement with seat 41 by a spring 43. An annular plate 44 is disposed between housing 40 and a cap 45 which has an opening 34' therein. Opening 34' communicates with line 34 of Figure 1. A member 46 is suspended within the valve assembly by means of diaphragms 47 and 48. The lower portion of member 46 forms a valve seat 50 which is adapted to be engaged by a valve head 51 that is attached to valve head 42 by a shaft 52. Spring 43 tends to urge valve head 51 into engagement with seat 50. Member 47 and plate 44 are provided with respective passages 53 and 54 which communicate between a region 55 within member 46 and a region exterior of the valve assembly.

Selector relay 30 is adjusted so that the output pressure delivered through opening 37' is equal to the lower one of the two inlet pressures applied to openings 29' and 34'. If the pressure applied to opening 34' exceeds the pressure applied to opening 29', member 46 is displaced downwardly so that valve head 51 is in engagement with valve head 50 and valve head 42 is displaced downwardly from valve head 41. The pressure applied to opening 29' is thus transmitted directly to outlet opening 37'.

If the pressure applied to inlet opening 29' exceeds the pressure applied to opening 34', member 46 tends to be displaced upwardly so that the interior of housing 40 is in communication with vent passages 54. This permits inlet air in opening 29' to be vented to atmosphere. The apparatus is adjusted so that the two valves tend to come to rest at positions so that sufficient air is applied from the assembly to maintain the outlet pressure at opening 37' equal to the inlet pressure at opening 34'.

As a specific example of the operation of the control system of this invention, reference is made to the drying of polyethylene to remove cyclohexane therefrom. Dryer 10 is of the configuration described and is approximately 19 feet in diameter and 25 feet high. Wet polymer is introduced into the dryer at a rate of approximately 6400 pounds per hour and at a temperature of approximately 120° F. The contact time of the cyclohexane in dryer 10 varies from about one-half to two hours. Cyclohexane vapor is introduced into dryer 10 at a temperature in the range of 250 to 280° F. and the vapors are exhausted from dryer 10 at a temperature in the range of 230 to 250° F. The dried polymer is removed at a temperature of 200 to 240° F.

Controller 27 is set to maintain a preselected temperature within the drier, such as 230° F., for example. This controller operates to establish an output air pressure which is an inverse function of the temperature at element 26. If the measured temperature should rise, the output pressure in line 29 decreases; if the measured temperature should fall, the output pressure increases. Temperature controller 32 also establishes an output pressure in line 34 which is an inverse function of the temperature in conduit 18. Controller 32 is provided to prevent the temperature of the vapor directed to dryer 10 from exceeding a predetermined value, such as 280° F. for example. As long as the temperature in conduit 18 does not exceed this value, the output pressure from controller 27 is less than the output pressure from controller 32. The pressure from controller 27 is thus applied through relay 30 to control line 37. The primary control of the vapor temperature is accomplished by means of valve 25. If the temperature in dryer 10 should fall below the desired value, the output pressure of controller 27 increases, and this pressure is applied to tend to close valve 25. Closure of valve 25 reduces the amount of vapor which bypasses blower 15 so that a greater amount of heated vapor is directed toward dryer 10. If this control step is not sufficient to elevate the temperature in dryer 10 to the desired value, a further increase in pressure from controller 27 tends to open valve 23 to supply heating material to superheater 17. If the temperature in dryer 10 should become excessive, the control procedure is reversed with valve 23 closing first and valve 25 then opening.

If the temperature in conduit 18 should become excessive, the output pressure of controller 32 falls below the output pressure of controller 27 so that the pressure in line 34 is applied to control line 37. This decrease in output pressure further closes valve 23 and further opens valve 25 to reduce the temperature of the vapor supplied to dryer 10, thereby providing a positive override control which prevents the temperature of the drying vapors from exceeding the maximum permissible temperature.

In view of the foregoing description it should be apparent that there is provided in accordance with this invention an improved control system for regulating the temperatures of drying apparatus. This control system normally tends to maintain the dryer at a predetermined temperature, and exerts a positive override control to prevent vapors from being introduced into the dryer at excessive temperatures.

While the invention has been described in conjunction with a present preferred embodiment, it should be evident that it is not limited thereto.

What is claimed is:

1. Apparatus for drying materials comprising a vessel adapted to receive the material to be dried, first conduit means communicating with said vessel to supply a heated gas, a blower in said first conduit means to direct the heated gas to said vessel, a heater in said first conduit means downstream from said blower, second conduit means communicating with said heater to supply a heating medium thereto to elevate the temperature of said heated gas, a first valve in said second conduit means, third conduit means communicating between said first conduit means at regions upstream and downstream from said blower, respectively, a second valve in said third conduit means, first temperature responsive means positioned to measure the temperature in said vessel, first means responsive to said first temperature responsive means to control said first and second valves to tend to maintain the temperature in said vessel at a predetermined value, second temperature responsive means positioned to measure the temperature of the gas in said first conduit means downstream from said heater, and second means responsive to said second temperature responsive means to control further said first and second valves to prevent the temperature of the gas directed to said vessel from exceeding a preselected value.

2. The apparatus of claim 1 wherein said first means to control closes said second valve to tend to maintain the temperature in said vessel at the preselected value and thereafter opens said first valve when additional heat is required, said first valve being closed before said second valve is opened when less heat is required, and wherein said second means to control first closes said first valve and thereafter opens said second valve when the temperature of the gas in said first conduit means becomes excessive.

3. The apparatus of claim 1 wherein said temperature responsive means comprise means to establish pneumatic pressures representative of the measured temperatures, said first and second valves are pneumatically operated, and said means to control comprise a selector relay to apply the output pressures of said temperature responsive means selectively to said valves.

4. Apparatus for drying materials comprising a vessel adapted to receive the material to be dried, first conduit means communicating with said vessel to supply a heated gas, a blower in said first conduit means to direct the heated gas to said vessel, a heater in said first conduit means downstream from said blower, second conduit means communicating with said heater to supply a heating medium thereto to elevate the temperature of said heated gas, a first pneumatically operated valve in said second conduit means, said first valve being adapted to be opened by increased pressure applied thereto, third conduit means communicating between said first conduit means at regions upstream and downstream from said blower, respectively, a second pneumatically operated valve in said third conduit means, said second valve being adapted to be closed by increased pressure applied thereto, first temperature responsive means to establish a first pneumatic pressure that is an inverse function of the temperature in said vessel, second temperature responsive means to establish a second pneumatic pressure that is an inverse function of the temperature of gas in said first conduit means downstream from said heater, a selector relay having said first and second pressures applied to the respective inputs thereof, said selector relay providing an output pressure which is representative of the lower of the input pressures applied thereto, and means applying the output pressure of said relay to said first and second valves, said first temperature responsive means normally providing an output pressure lower than the output pressure of said second temperature responsive means except when the temperature of gas in said first conduit means exceeds a preselected value.

5. Apparatus for drying materials comprising a vessel adapted to receive the material to be dried, first conduit means communicating with said vessel to supply a heated gas, first means to regulate the flow of gas through said first conduit means, a heater in said first conduit means, second means to control said heater, third means responsive to the temperature within said vessel to adjust said first means to regulate and said second means to control to tend to maintain a predetermined temperature in said vessel by increasing the flow of gas through said conduit means and thereafter increasing the heat output of said heater when additional heat is required in said vessel and by decreasing the output of said heater and thereafter decreasing the flow of gas through said conduit means when less heat is required in said vessel, and fourth means responsive to the temperature of gas within said first conduit means downstream from said heater to adjust further said first means to regulate and said second means to control to prevent the temperature of the gas in said first conduit means downstream from said heater from exceeding a preselected value by decreasing the heat output of said heater and thereafter decreasing the flow of gas through said first conduit means when the temperature of the gas in said first conduit means downstream from said heater becomes excessive.

References Cited in the file of this patent

UNITED STATES PATENTS

| | | |
|---|---|---|
| 1,339,374 | Buensod | May 4, 1920 |
| 1,840,723 | King | Jan. 12, 1932 |
| 2,525,535 | Erisman et al. | Oct. 10, 1950 |
| 2,653,391 | Edmunds | Sept. 29, 1953 |